United States Patent
Baldwin et al.

(10) Patent No.: US 7,763,557 B2
(45) Date of Patent: Jul. 27, 2010

(54) PORCELAIN ENAMEL HAVING A METALLIC APPEARANCE

(75) Inventors: Charles A. Baldwin, Brooklyn, OH (US); David P. Fedak, Cleveland, OH (US); Bradley E. Devine, Olmsted Township, OH (US)

(73) Assignee: Ferro Corporation, Cleveland, OH (US)

( * ) Notice: Subject to any disclaimer, the term of this patent is extended or adjusted under 35 U.S.C. 154(b) by 786 days.

(21) Appl. No.: 10/585,526

(22) PCT Filed: May 10, 2006

(86) PCT No.: PCT/US2006/017926
§ 371 (c)(1),
(2), (4) Date: Oct. 25, 2006

(87) PCT Pub. No.: WO2006/124415
PCT Pub. Date: Nov. 23, 2006

(65) Prior Publication Data
US 2007/0265154 A1    Nov. 15, 2007

(51) Int. Cl.
*C03C 8/00* (2006.01)
*C03C 8/02* (2006.01)
*C03C 8/08* (2006.01)
*C03C 8/14* (2006.01)
*C03C 8/20* (2006.01)
*C03C 8/22* (2006.01)

(52) U.S. Cl. .......................... 501/14; 501/16; 501/17; 501/18; 501/24; 501/25

(58) Field of Classification Search .............. 501/14, 501/16, 17, 18, 24, 25
See application file for complete search history.

(56) References Cited

U.S. PATENT DOCUMENTS

| 2,898,218 | A | 8/1959 | Voss et al. |
| 3,098,753 | A | 7/1963 | Van Dolah et al. |
| 3,556,821 | A * | 1/1971 | Hanzlik et al. ................. 501/25 |
| 3,580,733 | A | 5/1971 | Ott |
| 5,296,415 | A | 3/1994 | Podesta |
| 5,382,552 | A | 1/1995 | Saad et al. |
| 6,004,894 | A | 12/1999 | Faust et al. |
| 6,566,289 | B2 | 5/2003 | Aronica et al. |
| 6,821,628 | B2 | 11/2004 | Schultheis et al. |
| 6,831,027 | B2 | 12/2004 | Gazo |
| 2004/0018932 | A1 * | 1/2004 | Yuriditsky et al. ............. 501/21 |

OTHER PUBLICATIONS

International Search Report for PCT/US06/17926 dated Oct. 25, 2006, three pages.

* cited by examiner

*Primary Examiner*—David M Brunsman
(74) *Attorney, Agent, or Firm*—Rankin, Hill & Clark LLP

(57) ABSTRACT

A porcelain enamel composition having a metallic appearance is disclosed. The composition comprises about 45% to about 55% $SiO_2$, about 4 to about 20% $R_2O$, about 9 to about 15% $B_2O_3$, about 4 to about 12% $MnO_2$, about 1.5 to about 7% $F_2$, about 0% to about 20% $MO_2$, about 0% to about 10% RO, about 0% to about 6% $NO_2$, about 0% to about 2% $P_2O_5$, about 0% to about 3% CoO, about 0% to about 3% NiO, about 0% to about 3% $Al_2O_3$, about 0% to about 3% $Fe_2O_3$, about 0% to about 3% CuO, about 0% to about 4% $ZrO_2$, about 0% to about 2% $Nb_2O_5$, and about 0% to about 5% $Sb_2O_3$, wherein $R_2O$ represents at least one alkali oxide, wherein RO represents at least one alkaline earth oxide and wherein $MO_2$ represents at least one opacifying pigment selected from the group consisting of $ZrO_2$, TiO2, $CeO_2$, $SnO_2$ and $La_2O_3$.

20 Claims, No Drawings

PORCELAIN ENAMEL HAVING A METALLIC APPEARANCE

This application is a 371 filing of PCT/US06/17926, filed May 10, 2006.

BACKGROUND OF THE INVENTION

1. Field of Invention

The present invention relates to a porcelain enamel coating having a metallic appearance. More particularly, the present invention relates to a composition containing a glass component, which when fired, forms a porcelain enamel coating having a metallic appearance, a method of forming a porcelain enamel coating having a metallic appearance and articles having a surface provided with a porcelain enamel coating having a metallic appearance.

2. Description of Related Art

Porcelain enamel coatings have long been used to protect metal surfaces from abrasion, corrosion and other chemical and mechanical damage. Through the use of various pigments, coloring oxides and mill additions, it is possible to form decorative porcelain enamel coatings in a wide variety of colors, textures and glosses. However, prior art efforts to formulate porcelain enamel coatings having a metallic appearance have generally not met with success.

Metal particles have been added to porcelain enamel compositions in the past to form composite "cermet" coatings. As noted in Mumford et al., U.S. Pat. No. 4,555,415, the addition of metal particles, and in particular aluminum particles, to conventional porcelain enamel coating compositions results in enamels that are prone to "foaming" during their preparation, producing porous coatings. In some applications, such as the interior surface of oven cavities, such porous coatings can provide certain advantages. However, where the enamel is intended to provide a decorative coating that also protects the underlying surface from chemical and mechanical wear, such porosity is generally considered to be a disadvantage.

BRIEF SUMMARY OF THE INVENTION

The present invention provides a composition for use in forming a porcelain enamel coating having a metallic appearance. The composition according to the invention preferably comprises a low shear blend of a glass component comprising at least one glass frit that fuses at a temperature in the range of about 1300-1700° F. (about 704-927° C.). While they are not required, it may be advantageous to include relatively small proportions of metal particles such as aluminum, nickel, copper and stainless steel. Upon firing at a temperature of from about 1400-1600° F. (about 760-870° C.), the composition forms a non-porous vitreous porcelain enamel coating that has a metallic appearance, which through the incorporation of various optional pigments and/or mill additions, can range from a bright brushed nickel or stainless steel appearance to matte dark metallic finish, having an appearance similar to that of copper, brass, or bronze.

In a broad conception of the invention, the glass component comprises a frit composition comprising oxides and frit forming ingredients including about 45-55% $SiO_2$; about 9-15% $B_2O_3$, about 4-20% alkali oxides, about 4-12% $MnO_2$; and about 1-7% $F_2$. In the claims and specification, the glass component will be defined in terms of oxides in weight percentage to form 100 wt % of the glass frit while pigments and other mill additions will be defined in parts by weight (pbw) added to 100 pbw of the glass component. Optionally, the glass component may include alkaline earth oxides (up to 10%) and an opacifier (up to 20%) selected from the group consisting of $ZrO_2$, $TiO_2$, $CeO_2$, $SnO_2$ and $La_2O_3$.

In addition to a metallic appearance frit, other types of frits can be added to the enamel to provide different colors and appearances. These include titanium-opacified frits, luster frits, and clear/semi-opaque frits.

Additional metal oxides such as oxides of cobalt, copper, manganese, nickel, iron and chromium, can be smelted into the glass to improve adhesion of the fired porcelain enamel coating to certain metal surfaces and/or to tint the resulting color of the fired porcelain enamel coating. The oxidic ingredients are smelted at 2250-2400° F. (1232 to 1316° C.) to form one or more glass frits. Such glass frit will fuse at a firing temperature of from about 1400° F. to about 1600° F. (760° C. to 870° C.).

The present invention also provides a method of forming a porcelain enamel coating having a metallic appearance and articles coated therewith. The method according to the invention comprises blending glass-forming and glass-modifying oxides, pigments and optional ingredients, to form a green paste, which is applied to a substrate, and firing the green paste at a temperature of from about 1300° F. to about 1700° F. to form the porcelain enamel coating.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Porcelain enamel with the appearance of stainless steel has been sought for use in many industries, including, especially, the home appliance industry. Although consumers generally consider stainless steel visually superior, it is actually inferior to porcelain enamel in terms of heat resistance, scratch resistance, and cleanability. The most effective and economical way to match the look of stainless steel or other metals is to match the color of an enamel coating as closely as possible to that of the target metal (stainless steel, bronze, copper, etc). To that end, color is quantified using L-a-b values where L is the brightness, +a is red, −a is green, +b is yellow, and −b is blue. The L-a-b color of an object can be interpreted as a point in three-dimensional space.

Metallic Appearance Frits. Several glass frits have been developed with the goal of matching the appearance of a metal. The oxides used are shown in Table 1 (in weight percent).

TABLE 1

Oxide composition for metallic appearance frits.

| Oxide | Range (Wt %) |
|---|---|
| $Al_2O_3$ | 0-3 |
| $B_2O_3$ | 9-15 |
| CaO | 0-3 |
| CoO | 0-3 |
| CuO | 0-3 |
| $F_2$ | 1.5-7 |
| $Fe_2O_3$ | 0-3 |
| $MnO_2$ | 4-12 |
| $Nb_2O_5$ | 0-2 |
| NiO | 0-3 |
| $NO_2$ | 0-6 |
| $P_2O_5$ | 0-2 |
| RO | 0-10 |

TABLE 1-continued

Oxide composition for metallic appearance frits.

| Oxide | Range (Wt %) |
|---|---|
| $R_2O$ | 4-20 |
| $Sb_2O_3$ | 0-5 |
| $SiO_2$ | 45-55 |
| $MO_2$ | 0-20 |
| $ZrO_2$ | 0-4 |

The formula $R_2O$ represents alkali oxides, preferably selected from the group consisting of $Li_2O$, $Na_2O$, and $K_2O$. The formula RO represents alkaline earth oxides, preferably selected from the group consisting of MgO, CaO, SrO, and BaO. The formula $MO_2$ represents opacifiers, wherein M represents at least one transition metal, wherein $MO_2$ is preferably selected from the group consisting of $TiO_2$, $CeO_2$, $SnO_2$ and $CeO_2$. $MO_2$ may also stand for $La_2O_3$. These oxides are commonly used to flux glasses. Each generic formula (i.e., $MO_2$, $R_2O$, RO) also represents combinations of the respective oxides.

In a preferred embodiment, each range in Table 1 having a lower bound of zero may be bounded by 0.01% instead. Other preferred embodiments include one that lacks iron oxide and includes cerium oxide. The cerium oxide may be present to the extent of about 0.1 to 20%, preferably about 1 to 10%. The oxides of cobalt, copper, manganese, chrome, iron, and nickel, as set forth in Table 1, above, are known as "coloring oxides," which can be smelted into the glass composition to improve adhesion of the fired porcelain enamel coating to certain metals (e.g., sheet steel) and to "tint" the final metallic appearance of the fired porcelain enamel coating.

The glass frit or frits that comprise the glass component may be prepared utilizing conventional glass melting techniques. A conventional ceramic refractory, fused silica, or platinum crucible may be used to prepare the glass frit. Typically, selected oxides are smelted at about 2200° F. to 2400° F. (1204 to 1316° C.) for 30 minutes. The molten glass formed in the crucible is then cooled quickly to form a glass frit using water-cooled rollers and milling equipment. It will be appreciated that the step of producing the glass frit is not per se critical and any of the various techniques well known to those skilled in the art can be employed.

For this work, titanium-opacified whites contain greater than 13 wt % $TiO_2$. The titanium dioxide precipitates out of the glass during firing to give a bright white appearance and significant opacity and hiding power.

Luster frits are clear alkali borosilicate frits with 8-10 wt % smelted-in $MnO_2$. These frits provide a metallic sheen but not necessarily opacity.

Clear/semi-opaque frits contain up to 13 wt % $TiO_2$. The titanium dioxide level is insufficient to obtain a white color through recrystallization of the $TiO_2$ but instead provide a medium for added oxide pigments to create a colored porcelain enamel surface with or without some opacity.

TABLE 2

Titanium opacified frits, luster frit, clear/semi-opaque frits.

| Oxide | Opacified Frit | Luster Frit | Clear Frit |
|---|---|---|---|
| $Al_2O_3$ | 0-6 | 0-2 | 0-3 |
| AuO | 0-0.05 | — | — |
| BaO | 0-5 | — | 0-5 |
| $B_2O_3$ | 0-23 | 15-17 | 11-17 |
| CaO | 0-2.5 | 0-1 | 0-3 |
| CoO | 0-0.05 | 0-1 | — |
| CuO | — | 0-1 | — |
| $F_2$ | 0-9 | 1.7-3.5 | 1-10 |
| $Fe_2O_3$ | — | 0-2 | — |
| $K_2O$ | 0-13 | 2-9 | 0-12 |
| $Li_2O$ | 0-4 | 0-4 | 0-4 |
| MgO | 0-1.5 | — | 0-1 |
| $MnO_2$ | — | 8-10 | — |
| $Na_2O$ | 5-20 | 5-20 | 5-20 |
| NiO | — | 0-1 | — |
| $NO_2$ | 1-10 | 0-6 | 0-4 |
| $P_2O_5$ | 0-4 | 0-3 | 0-2 |
| $Sb_2O_3$ | 0-1.5 | 0-3 | — |
| $SiO_2$ | 33-57 | 46-54 | 46-57 |
| $TiO_2$ | 13-26 | — | 0-13 |
| ZnO | 0-23 | — | 0-3 |
| $ZrO_2$ | 0-10 | — | 0-3 |

Pigments. By incorporating pigments into the porcelain enamel composition, it is possible to produce a range of enamel finishes, from a bright metallic appearance to a matte ceramic metallic appearance. Pigments may be incorporated as mill additions in an amount up to about 25 pbw per 100 pbw of the glass component, preferably about 0.1 to about 10 pbw. Useful pigments may come from several of the major classifications of complex inorganic pigments, including corundum-hematite, olivine, priderite, pyrochlore, rutile, and spinel, though other categories such as baddeleyite, borate, garnet, periclase, phenacite, phosphate, sphene and zircon may be suitable in certain applications. Examples include iron brown hematite $Fe_2O_3$; cobalt silicate blue olivine $CO_2SiO_4$; nickel barium titanium primrose priderite 2NiO: $3BaO:17TiO_2$; lead antimonite yellow pyrochlore $Pb_2Sb_2O_7$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium antimony grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O_2$; cobalt aluminate blue spinel $CoAl_2O_4$; zinc chrome cobalt aluminum spinel $(Zn,Co)(Cr,Al)O_4$; cobalt chromate blue-green spinel $CoCr_2O_4$; cobalt titanate green spinel $CO_2TiO_4$; iron chromite brown spinel $Fe(Fe,Cr)O_4$; iron titanium brown spinel $Fe_2TiO_4$; nickel ferrite brown spinel $NiFe_2O_4$; zinc ferrite brown spinel $(Zn,Fe)Fe_2O_4$; zinc iron chromite brown spinel $(Zn,Fe)(Fe,Cr)O_4$; copper chromite black spinel $CuCr_2O_4$; iron cobalt chromite black spinel $(Co,Fe)(Fe,Cr)O_4$; chrome iron manganese brown spinel $(Fe,Mn)(Cr,Fe)O_4$; chrome iron nickel black spinel $(Ni,Fe)(Cr,Fe)O_4$; chrome manganese zinc brown spinel $(Zn,Mn)(Cr_2O_4)$; nickel manganese iron chromium black $(Ni,Mn)(Fe,Cr)O_4$, tin vanadium yellow cassiterite $(Sn,V)O_2$; chrome tin orchid cassiterite $(Sn,Cr)O_2$; and chrome tin pink sphene, $CaO:SnO:SiO_2$: $Cr_2O_3$ and combinations thereof.

Other specialty pigments useful herein include titanium-opacifying pigments, which are known in the art to contain at least about 18 wt %, preferably about 18-22 wt % smelted-in titanium dioxide that precipitates out of the glass during the enamel fire to form a white coating, with the balance comprising conventional glass frit oxides such as $SiO_2$, $B_2O_3$, $Bi_2O_3$, and the like.

Mill Additions. Also, specialty coated mica particles may be added in the amount of up to about 10 parts by weight (pbw) per 100 pbw of total glass component, in order to produce a metallic or sparkling effect. Mearl pigments, which are available from Englehard Corporation, include Magna-Pearl® 1000, MagnaPearl® 2000, MagnaPearl® 3000, PearlWhite® 9110 A, and SuperFine® 9120V, or available from Magna Pearl under the Mearlin® trademark, can also be used to produce a "metal flake" finish in the fired enamel. Mearl pigments comprise mica particles that have been treated with oxides of iron, tin, titanium, chrome and/or cobalt, to alter the surface appearance. Other particulates useful herein include Brass 9232 and Gold 9212P from Engelhard as well as Novamet® Fine Leafing Stainless Steel available from Novamet Specialty Products Corporation, Wyckoff, N.J.

Other mill additions, apart from the pigments as discussed above, may be present to the extent of about 0.1-30 pbw (per 100 pbw of frits) and more preferably up to about 0.1-20 pbw. Such mill additions include clays such as bentonite and veegum, crystalline materials such as the chlorides, carbonates, and hydroxides, of sodium, potassium, magnesium, calcium; urea, boric acid, molybdic acid, sodium molybdate, and copper chloride.

Mill additions may further include refractory oxide fillers such as boro-alumina-silicates, alumina-silicates, calcium silicates, soda-calcia-alumina-silicates, wollastonite, feldspar, titanates, and combinations thereof. Mill additions may also include silicates of sodium, potassium, bismuth, and zinc, bismuth titanates, $Zn_2SiO_4$, $Bi_{12}SiO_{20}$, $Bi_4(SiO_4)_3$, $Bi_2SiO_5$, $2ZnO.3TiO_2$, $Bi_2O_3.SiO_2$, $Bi_2O_3.2TiO_2$, $2Bi_2O_3.3TiO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, and $Bi_2Ti_4O_{11}$.

The firing temperature of the composition should be at least about 1300° F. but less than about 1700° F., and preferably from about 1400° F. to about 1600° F. When fired at temperatures greater than about 1700° F., the composition may not produce a porcelain enamel having a metallic appearance. Firing times will vary depending upon the thickness of the applied coating and the thickness of the substrate. Thicker gauges and applications require longer firing times. It is not advisable to raise the firing temperature above about 1600° F.

The enamel coating formed upon firing exhibits a bright metallic appearance that resembles brushed nickel or stainless steel. Incorporation of pigments and/or "coloring oxides" in the glass permits the formation of tinted coatings, such as a dark silvery metallic appearance. Other additives and combinations of oxides result in metallic appearances resembling copper, brass or bronze.

The composition according to the present invention can be applied using any of the conventional wet application processes, which are well known. Suitable wet application processes include spray, dipping, flow coating, and electrophoretic deposition. The disclosures of U.S. Pat. Nos. 5,002,903, 4,085,021 and 3,841,986 are incorporated herein by reference for their teachings relative to the electrophoretic application of porcelain enamel coating compositions.

The composition according to the invention can also be applied by dry application techniques. In such circumstances, a suitable organopolysiloxane is added to the composition so that it may be applied by conventional dry application means such as a standard corona discharge gun. The disclosures of U.S. Pat. Nos. 4,110,487 and 3,928,668 are hereby incorporated by reference for their teachings relative to the dry or electrostatic application of porcelain enamel coating compositions.

The composition may be applied to a substrate as a sprayed-on slurry. Preferably, the composition is applied so as to provide a coating thickness of from about 20 to about 250 microns, and more preferably from about 40 to about 150 microns, subsequent to firing. Expressed alternately, the composition may be applied at a rate of about 250 $g/m^2$ to about 650 $g/m^2$ or preferably about 300 $g/m^2$ to about 500 $g/m^2$. The slurry density prior to such application may be about 1.5 to about 2.0 g/cc, preferably about 1.7 to about 1.8 g/cc. The coating thickness is not critical, and can be varied based upon the particular application or need.

EXAMPLES

The following examples are intended only to illustrate the invention and should not be construed as imposing limitations upon the claims. Glass frits A and B presented in Table 3, form the basis of the experimental examples that follow.

TABLE 3

Glass frits A and B compositions for examples in wt %.

| Oxide | Frit A | Frit B |
|---|---|---|
| $Al_2O_3$ | 0.60 | 0.62 |
| $B_2O_3$ | 11.16 | 11.44 |
| CaO | 0.16 | 0.16 |
| $CeO_2$ |  | 9.62 |
| CoO | 1.13 |  |
| $F_2$ | 3.33 | 3.34 |
| $Fe_2O_3$ | 0.47 |  |
| $K_2O$ | 8.60 | 8.82 |
| $Li_2O$ | 0.02 |  |
| $MnO_2$ | 8.04 | 8.24 |
| $Na_2O$ | 5.15 | 5.27 |
| $Nb_2O_5$ | 0.04 |  |
| NiO | 0.63 |  |
| $NO_2$ | 2.68 | 2.68 |
| $P_2O_5$ | 1.13 | 1.15 |
| $SiO_2$ | 45.83 | 46.97 |
| $TiO_2$ | 10.99 | 1.64 |
| $ZrO_2$ | 0.05 | 0.06 |

Example 1

Glass frit A was smelted according to conventional means with the oxidic composition shown in Table 3. The frit was milled to a powder with silicone additives to a fineness of 96-98% on a 200 mesh screen. The powder was applied at a rate of about 35.7 $g/ft^2$ (384.3 $g/m^2$) electrostatically to ground coated decarburized steel and fired at 1500±50° F. (816±28° C.) for 4 minutes in a continuous furnace. The fired enamel showed a value of L of 32.72 to 33.70 with a 60 degree gloss of up to 172.6, a spot acid resistance of AA, and a metallic sheen having a mirror-like finish.

Example 2

Frit A from Example 1 was milled in the wet mill addition shown in Table 4 to make Enamel A.

TABLE 4

Mill addition formula for Enamel A.

| Material | Enamel A (pbw) |
|---|---|
| Frit A | 100 |
| Clay | 4-7 |
| Bentonite | 0.25 |
| Potassium Chloride | 0.125 |
| Urea | 0.5 |
| Boric Acid | 0.125 |
| Copper Chloride | 0.094 |
| Titanium Dioxide | 5.0 |
| Water | 42 |

A slip was formed from Enamel A, and blended with mica-based pearlescent pigments or fine leafing grade stainless steel as shown in Table 5. Brass 9232, Gold 9212P and the MagnaPearl products are commercially available as noted hereinabove. The resulting colors had the appearance of brass when the enamel was applied to ground coated steel at a rate of about 35.7 g/ft$^2$ and fired at 1500±50° F. for 4 minutes in a continuous furnace. Color values shown are for 1450° F. (788° C.) for blends 1, 3, 4 and 1500° F. for blend 2.

TABLE 5

Coating blends made with enamel A.

| | Blend 1 | Blend 2 | Blend 3 | Blend 4 |
|---|---|---|---|---|
| | (pbw) | | | |
| Enamel A | 200 | 200 | 200 | 200 |
| MagnaPearl 1000 | 10 | 10 | — | — |
| MagnaPearl 3000 | — | — | 10 | 10 |
| Brass 9232 | 1 | — | — | — |
| Gold 9212 P | — | 1 | — | — |
| Fine Leafing Stainless | — | — | — | 1 |
| Appearance after firing | | | | |
| L color value | 38.86 | 39.45 | 48.78 | 45.34 |
| a color value | 0.75 | 0.79 | 0.37 | 0.42 |
| b color value | 4.86 | 5.22 | 4.35 | 3.83 |
| Apparent Color | Brass | Brass | Brass | Brass |

Example 3

Frit A (Table 3) was wet milled with additives using the formulation shown in Table 4, and frits C through G are titanium opacified frits shown in Table 6.

TABLE 6

Titanium-opacified frits for Example 3, ingredients in wt %.

| Oxide | Frit C | Frit D | Frit E | Frit F | Frit G |
|---|---|---|---|---|---|
| Al$_2$O$_3$ | — | 2.05 | 0.72 | — | 5.07 |
| AuO | — | 0.04 | — | — | — |
| B$_2$O$_3$ | 14.73 | 11.84 | 12.83 | 13.83 | 18.26 |
| CaO | — | — | — | 0.07 | — |
| CoO | — | 0.02 | — | — | — |
| CuO | — | — | — | — | — |
| F$_2$ | 6.07 | 0.59 | 3.86 | 7.87 | 2.47 |
| K$_2$O | 7.93 | — | — | 6.67 | 1.41 |
| Li$_2$O | 0.85 | 0.37 | 3.16 | 0.39 | 3.66 |
| MgO | — | 0.41 | 0.17 | — | 1.14 |
| Na$_2$O | 7.73 | 10.03 | 9.40 | 9.12 | 7.35 |
| NO$_2$ | 2.74 | 2.96 | 3.17 | 1.30 | 2.38 |
| P$_2$O$_5$ | 1.51 | 1.46 | — | 1.02 | 2.02 |
| SiO$_2$ | 38.12 | 50.34 | 40.56 | 38.40 | 37.07 |
| TiO$_2$ | 19.84 | 19.90 | 16.86 | 18.37 | 13.14 |
| ZnO | 0.49 | — | — | 0.64 | — |
| ZrO$_2$ | — | — | 9.27 | 2.33 | 6.03 |

TABLE 7

Enamels B-F. Metallic appearance frit B with titanium opacified cover coats (Frits C-G).

| | Enamel B | Enamel C | Enamel D | Enamel E | Enamel F |
|---|---|---|---|---|---|
| | | | (pbw) | | |
| Material | | | | | |
| Frit A | 80 | 80 | 80 | 80 | 80 |
| Frit C | 20 | — | — | — | — |
| Frit D | — | 20 | — | — | — |
| Frit E | — | — | 20 | — | — |
| Frit F | — | — | — | 20 | — |
| Frit G | — | — | — | — | 20 |
| Clay | 5.6 | 5.6 | 5.6 | 5.6 | 5.6 |
| Bentonite | 0.25 | 0.25 | 0.25 | 0.25 | 0.25 |
| Potassium Chloride | 0.125 | 0.125 | 0.125 | 0.125 | 0.125 |
| Copper Chloride | 0.094 | 0.094 | 0.094 | 0.094 | 0.094 |
| Magnesium Carbonate | 0.25 | 0.25 | 0.25 | 0.25 | 0.25 |
| Titanium Dioxide | 1.0 | 1.0 | 1.0 | 1.0 | 1.0 |
| Zirconium Silicate | 4.0 | 4.0 | 4.0 | 4.0 | 4.0 |
| Water | 47 | 47 | 47 | 47 | 47 |
| Appearance after firing | | | | | |
| L color value | 28.92 | 36.59 | 36.31 | 35.20 | 35.56 |
| a color value | 1.52 | 1.34 | 1.29 | 1.47 | 1.85 |
| b color value | 5.25 | 4.66 | 5.81 | 5.27 | 5.66 |
| Apparent Color | Mottled brass | Mottled brass | Mottled brass | Mottled brass | Mottled brass |

Enamels B through F were formed into a wet slip, which was applied to ground coated decarburized steel at a rate of about 35.7 g/ft$^2$ and fired at 1500±50° F. (815±27° C.) for 4 minutes in a continuous furnace. At the 1500° F. (816° C.) for 4 minutes fire, the resulting enamels had the color values shown with a white fleck.

Example 4

Glass frit B was smelted according to conventional means with the oxidic composition shown in Table 3. The frit was then milled with either luster frits shown in Table 8 or clear/semi-opaque frits shown in Table 9.

TABLE 8

Luster frit glass compositions H & I, ingredients in wt %.

| Oxide | Frit H | Frit I |
|---|---|---|
| Al$_2$O$_3$ | 1.20 | 1.01 |
| B$_2$O$_3$ | 16.08 | 16.75 |
| CaO | 0.07 | 0.97 |
| CoO | 0.36 | — |
| F$_2$ | 2.15 | 1.73 |
| Fe$_2$O$_3$ | 1.21 | 1.28 |
| K$_2$O | 4.42 | 4.67 |
| MnO$_2$ | 8.29 | 8.94 |
| Na$_2$O | 9.39 | 9.01 |

TABLE 8-continued

Luster frit glass compositions H & I, ingredients in wt %.

| Oxide | Frit H | Frit I |
|---|---|---|
| $NO_2$ | 1.21 | 6.01 |
| $P_2O_5$ | — | 0.97 |
| $Sb_2O_3$ | 2.05 | 2.07 |
| $SiO_2$ | 53.58 | 46.60 |

TABLE 9

Clear/semi-opaque frits J, K, and L, ingredients in wt %.

| Oxide | Frit J | Frit K | Frit L |
|---|---|---|---|
| $Al_2O_3$ | 1.48 | 0.66 | — |
| $B_2O_3$ | 12.64 | 15.26 | 14.71 |
| BaO | — | 2.08 | — |
| CaO | 0.60 | 0.04 | 0.12 |
| $F_2$ | 4.69 | 6.75 | 4.13 |
| $K_2O$ | 9.68 | — | 5.32 |
| $Li_2O$ | 1.08 | — | 0.51 |
| MgO | — | 0.33 | — |
| $Na_2O$ | 6.83 | 19.58 | 9.64 |
| $NO_2$ | 2.32 | — | 2.34 |
| $P_2O_5$ | — | — | 1.04 |
| $SiO_2$ | 51.68 | 46.85 | 46.26 |
| $TiO_2$ | 7.67 | 8.45 | 10.94 |
| ZnO | — | — | 2.48 |
| $ZrO_2$ | 1.32 | — | 2.52 |

Slurries of enamels G through K, shown in Table 10 were milled to a fineness of 2-3 g on a 200 mesh screen from a 50 cc sample, the specific gravity was set to 1.74-1.76 g/cc, and 0.5% urea was dissolved in the enamels.

TABLE 10

Enamels G-K; metallic appearance Frit B slurried with luster frits.

| | Enamel G | Enamel H | Enamel I (pbw) | Enamel J | Enamel K |
|---|---|---|---|---|---|
| Material | | | | | |
| Frit B | 80 | 80 | 80 | 80 | 90 |
| Frit H | 20 | — | — | — | — |
| Frit I | — | 20 | — | — | — |
| Frit J | — | — | 20 | — | — |
| Frit K | — | — | — | 20 | — |
| Frit L | — | — | — | — | 10 |
| CoSi Oxide | — | 2.5 | 2.5 | 2.5 | 2.5 |
| TiSbV Oxide | 2 | — | — | — | — |
| CrSn Oxide | — | 2 | 2 | 2 | 2 |
| Clay | 5.6 | 5.6 | 5.6 | 5.6 | 5.6 |
| Bentonite | 0.25 | 0.25 | 0.25 | 0.25 | 0.25 |
| $MgCO_3$ | 0.25 | 0.25 | 0.25 | 0.25 | 0.25 |
| $TiO_2$ | 1 | 1 | 1 | 1 | |
| $ZrSiO_4$ | 4 | 4 | 4 | 4 | 4 |
| Water | 47 | 47 | 47 | 47 | 47 |
| Appearance after firing | | | | | |
| L color value | 35.44 | 36.95 | 33.94 | 36.25 | 36.97 |
| A color value | 0.67 | 0.42 | 0.27 | 0.13 | −0.05 |
| B color value | 2.09 | 1.62 | 0.55 | −0.12 | 0.69 |
| 60° gloss | 105.0 | 79.4 | 130.2 | 97.1 | 73.7 |
| Apparent color | bronze | bronze | dark stainless steel | dark stainless steel | silver |

Enamels G through K were applied to ground coated sheet steel at a rate of about 35.7 g/ft$^2$ and fired between 1450° F. and 1600° F. in a continuous furnace for 4-6 minutes in the hot zone. Color and gloss values in Table 10 are shown for the 1500° F. fire.

Example 5

Enamel J was applied to cast iron and fired at 1450° F. for 22 minutes. The resulting fired surface had a metallic sheen and appearance.

Example 6

Enamel J was applied to 10 cm×10 cm ground coated test coupons under the same conditions as in Example 3. Additionally, panels were coated with enamel L and powder A. Enamel L is a reconstituted premilled powder containing frit K and oxide pigment. Powder A is an acid-resistant commercially available electrostatically applied white cover coat enamel powder with fired properties suitable for cooktops, commercially available as PC36-C, from Ferro Corporation. PC36-6 is a dry milled mixture of titanium dioxide-opacified alkali borosilicate frits that fires between 1470° F. and 1540° F. It is a commercially-available typical Ferro white enamel for major cooking appliances.

First, the enamels were tested according to ASTM D 4060-95 "Standard Test Method for Abrasion Resistance of Organic Coatings by the Taber Abraser" and then according to ASTM C 282-54, "Resistance of Porcelain Enameled Utensils to Boiling Acid" for 6 hours with both 6% citric acid aqueous solution and 5% tetrasodium pyrophosphate solution. The Taber Rotary Platform Abraser is an accelerated wear-testing device available from Taber Industries, North Tonawanda, N.Y. Third, the fired enamels were tested according to ASTM C 282-99 "Standard Test Method for Acid Resistance or Porcelain Enamels (Citric Acid Spot Test)". Lastly, the panels were exposed to three heating cycles at 600° F. (316° C.) for 30 minutes followed by immersion into room temperature water to test thermal shock resistance. Test results are shown in Table 11.

In the above tests, the weight loss values for the abrasion, acid and alkali tests indicate that the metallic-appearance enamels should be suitable for a wide range of applications including but not limited to surfaces currently coated with enamels firing in the range of 1500° F., such as cooktops, ranges, sanitary ware, refrigerator exteriors, steel or cast iron cookware and bake ware, car mufflers, laundry washing machines, laundry drying or barbecue grills.

TABLE 11

Acid, alkali and abrasion testing results on metallic-appearance enamels.

| Test | Enamel J | Enamel L | Powder A |
|---|---|---|---|
| Taber Abrasion | | | |
| Initial enamel, wt (g) | 75.54 | 73.92 | 74.42 |
| Final enamel wt (g) | 75.53 | 73.91 | 74.41 |
| Weight loss (g) | 0.01 | 0.01 | 0.01 |
| Boiling Acid wt loss | 1.83 mg/in$^2$ | 4.31 mg/in$^2$ | 4.55 mg/in$^2$ |
| Boiling Alkali wt loss | 0.86 mg/in$^2$ | 3.85 mg/in$^2$ | 18.65 mg/in$^2$ |
| Spot Acid Resistance | AA | AA | AA |
| Thermal Shock | No chipping | No chipping | No chipping |

Example 7

Enamels M through Q were milled to a fineness of 2-3 cc on a 200 mesh screen from a 50 cc sample as shown in Table 12. Amounts are given in parts by weight. These were applied at a rate of about 35.7 g/ft² to fired ground coat and fired at 1450° F. to 1550° F. The fired enamels had values of L, a, and b shown in Table 12 which, with the increased a and b values, gave the suggestion of metallic copper.

TABLE 12

Copper colored enamels M through Q, compositions and appearance.

| | Enamel M | Enamel N | Enamel O (pbw) | Enamel P | Enamel Q |
|---|---|---|---|---|---|
| Material | | | | | |
| Frit B | 80 | 60 | 80 | 60 | 60 |
| Frit H | — | — | 20 | 40 | — |
| Frit K | 20 | 40 | — | — | 40 |
| Iron Oxide | 3 | 3 | 3 | 3 | — |
| CrSn Oxide | 2 | 2 | 2 | 2 | 2 |
| FeCrZn Oxide | — | — | — | — | 1.5 |
| CrFeZnAl Oxide | — | — | — | — | 1 |
| Clay | 5.5 | 5.5 | 5.5 | 5.5 | 5.5 |
| Bentonite | 0.25 | 0.25 | 0.25 | 0.25 | 0.25 |
| Magnesium Carbonate | 0.25 | 0.25 | 0.25 | 0.25 | 0.25 |
| Zirconium Dioxide | 4 | 4 | 4 | 4 | 4 |
| Water | 47 | 47 | 47 | 47 | 47 |
| Appearance after Firing | | | | | |
| L color value | 28.47 | 30.07 | 28.64 | 24.56 | 29.27 |
| a color value | 2.90 | 4.62 | 2.73 | 3.65 | 6.59 |
| b color value | 3.00 | 6.48 | 2.12 | 3.15 | 5.04 |
| 60° gloss | 125.0 | 149.5 | 99.9 | 141.4 | 155.3 |
| Apparent color | Copper | Copper | Copper | Copper | Copper |

Slurries of enamels R and S, shown in Table 13 were milled to a fineness of 3-4 g on a 200 mesh screen from a 50 cc sample, the specific gravity was set to 1.74-1.76 g/cc, and 0.5% urea was dissolved in the enamels. These were applied at a rate of about 35.7 g/ft² to fired ground coat and fired at 1450° F. to 1550° F.

TABLE 13

Silver colored enamels R and S, compositions and appearance.

| | Enamel R (pbw) | Enamel S |
|---|---|---|
| Material | | |
| Frit B | 100 | 95 |
| Frit L | | 5 |
| CoSi Oxide | 2 | 3 |
| CrSn Oxide | 1.5 | 2 |
| Clay | 5.5 | 5.5 |
| Bentonite | 0.25 | 0.25 |
| Magnesium Carbonate | 0.25 | 0.25 |
| Zirconium Dioxide | 4 | 1 |
| Water | 47 | 47 |
| Appearance after Firing | | |
| L color value | 38.53 | 40.23 |
| a color value | 0.28 | 0.03 |
| b color value | 1.59 | 1.46 |
| 60° gloss | 57.2 | 69.2 |
| Apparent color | Silver | Silver |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A composition for use in forming a porcelain enamel coating having a metallic appearance, said composition including a glass component comprising a glass frit, said glass frit comprising by weight: about 45% to about 55% $SiO_2$, about 4 to about 20% $R_2O$, about 9 to about 15% $B_2O_3$, about 4 to about 12% $MnO_2$, about 1.5 to about 7% $F_2$, about 0% to about 20% $MO_2$, about 0% to about 10% RO, about 0.01% to about 6% $NO_2$, about 0% to about 2% $P_2O_5$, about 0% to about 3% CoO, about 0% to about 3% NiO, about 0.6% to about 3% $Al_2O_3$, about 0% to about 3% $Fe_2O_3$, about 0% to about 3% CuO, about 0% to about 4% $ZrO_2$, about 0% to about 2% $Nb_2O_5$, and about 0% to about 5% $Sb_2O_3$, wherein $R_2O$ represents at least one alkali oxide, wherein RO represents at least one alkaline earth oxide and wherein M represents at least one transition metal.

2. The composition of claim 1, wherein $R_2O$ is selected from the group consisting of $Na_2O$, $Li_2O$ and $K_2O$, or combinations thereof.

3. The composition of claim 1 wherein $MO_2$ is selected from the group consisting of $ZrO_2$, $SnO_2$, $TiO_2$ and $CeO_2$.

4. The composition of claim 1 wherein RO is selected from the group consisting of MgO, CaO, SrO, and BaO.

5. The composition of claim 1 further comprising a crystalline component wherein the crystalline component comprises additives selected from the group consisting of $TiO_2$, $ZrSiO_4$, $Zn_2SiO_4$, $Bi_{12}SiO_{20}$, $Bi_4(SiO_4)_3$, and $Bi_2SiO_5$, $2ZnO.3TiO_2$, $Bi_2O_3.SiO_2$, $Bi_2O_3.2TiO_2$, $2Bi_2O_3.3TiO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, and $Bi_2Ti_4O_{11}$.

6. The composition of claim 1 further comprising a mill addition selected from the group consisting of mica particles; clays; urea; boric acid, molybdic acid; sodium molybdate; copper chloride, and the chlorides, carbonates, and hydroxides, of sodium, potassium, magnesium, and calcium, and combinations thereof.

7. The composition of claim 1 further comprising a clear/semi-opaque frit, wherein the clear/semi-opaque frit comprises: $SiO_2$ (46-57%), $B_2O_3$ (11-17%), $Na_2O$ (5-20%), $F_2$ (1-10%), $TiO_2$ (0-13%), $NO_2$ (0-4%), $K_2O$ (0-12%), $Li_2O$ (0-4%), $Al_2O_3$ (0-3%), BaO (0-5%), CaO (0-3%), MgO (0-1%), $P_2O_5$ (0-2%), ZnO (0-3%), and $ZrO_2$ (0-3%).

8. The composition of claim 1 wherein the glass frit comprises by weight: about 45% to about 55% $SiO_2$, about 4 to about 20% $R_2O$, about 9 to about 15% $B_2O_3$, about 4 to about 12% $MnO_2$, about 1.5 to about 7% $F_2$, and at least one of the following oxides, not to exceed the indicated amount: $MO_2$ (20%), RO (10%), $NO_2$ (6%), $P_2O_5$ (2%), CoO (3%), NiO (3%), $Al_2O_3$ (3%), $Fe_2O_3$ (3%), CuO (3%), $ZrO_2$ (4%), $Nb_2O_5$ (2%), and $Sb_2O_3$ (5%), wherein $R_2O$ represents at least one alkali oxide, wherein RO represents at least one alkaline earth oxide and wherein M represents at least one transition metal.

9. An appliance comprising a porcelain enamel coating having a metallic appearance, said coating formed by firing the composition of claim 1.

10. A composition for use in forming a porcelain enamel coating having a metallic appearance, said composition including a (a) glass component comprising a glass frit, said glass frit comprising by weight: about 45% to about 55% $SiO_2$, about 4 to about 20% $R_2O$, about 9 to about 15% $B_2O_3$, about 4 to about 12% $MnO_2$, about 1.5 to about 7% $F_2$, about 0% to about 20% $MO_2$, about 0% to about 10% RO, about 0% to about 6% $NO_2$, about 0% to about 2% $P_2O_5$, about 0% to about 3% CoO, about 0% to about 3% NiO, about 0% to about 3% $Al_2O_3$, about 0% to about 3% $Fe_2O_3$, about 0% to about 3% CuO, about 0% to about 4% $ZrO_2$, about 0% to about 2% $Nb_2O_5$, and about 0% to about 5% $Sb_2O_3$, wherein $R_2O$ represents at least one alkali oxide, wherein RO represents at least one alkaline earth oxide and wherein M represents at least one transition metal and (b) an oxide pigment, selected from the group consisting of iron brown hematite; cobalt silicate blue olivine; nickel barium titanium primrose priderite; lead antimonite yellow pyrochlore; nickel antimony titanium yellow rutile; nickel niobium titanium yellow rutile; nickel tungsten yellow rutile; chrome antimony titanium buff; chrome niobium titanium buff rutile; chrome tungsten titanium buff rutile; manganese antimony titanium buff rutile; titanium vanadium antimony grey rutile; manganese chrome antimony titanium brown rutile; manganese niobium titanium brown rutile; cobalt aluminate blue spinel; zinc chrome cobalt aluminum spinel; cobalt chromate blue-green spinel; cobalt titanate green spinel; iron chromite brown spinel; iron titanium brown spinel; nickel ferrite brown spinel; zinc ferrite brown spinel; zinc iron chromite brown spinel; copper chromite black spinel; iron cobalt chromite black spinel; chrome iron manganese brown spinel; chrome iron nickel black spinel; chrome manganese zinc brown spinel; nickel manganese iron chromium black; tin vanadium yellow cassiterite; chrome tin orchid cassiterite; chrome tin pink sphene, and combinations thereof.

11. A composition for use in forming a porcelain enamel coating having a metallic appearance, said composition including a glass component comprising (a) a glass frit, said glass frit comprising by weight: about 45% to about 55% $SiO_2$, about 4 to about 20% $R_2O$, about 9 to about 15% $B_2O_3$, about 4 to about 12% $MnO_2$, about 1.5 to about 7% $F_2$, about 0% to about 20% $MO_2$, about 0% to about 10% RO, about 0% to about 6% $NO_2$, about 0% to about 2% $P_2O_5$, about 0% to about 3% CoO, about 0% to about 3% NiO, about 0% to about 3% $Al_2O_3$, about 0% to about 3% $Fe_2O_3$, about 0% to about 3% CuO, about 0% to about 4% $ZrO_2$, about 0% to about 2% $Nb_2O_5$, and about 0% to about 5% $Sb_2O_3$, wherein $R_2O$ represents at least one alkali oxide, wherein RO represents at least one alkaline earth oxide and wherein M represents at least one transition metal and (b) a titanium opacified frit wherein the titanium opacified frit comprises by weight: $SiO_2$ (33-57%), $B_2O_3$ (0-23%), $TiO_2$ (13-26%), $F_2$ (0-9%), $NO_2$ (1-10%), $Na_2O$ (5-20%), $K_2O$ (0-13%), $Li_2O$ (0-4%), $Al_2O_3$ (0-6%), AuO (0-0.05%), BaO (0-5%), CaO (0-2.5%), CoO (0-0.05%), MgO (0-1.5%), $P_2O_5$ (0-4%), $Sb_2O_3$ (0-1.5%), ZnO (0-23%), and $ZrO_2$ (0-10%).

12. The composition of claim 11, wherein $R_2O$ is selected from the group consisting of $Na_2O$, $Li_2O$ and $K_2O$, and combinations thereof.

13. The composition of claim 11 wherein $MO_2$ is selected from the group consisting of $ZrO_2$, $SnO_2$, $TiO_2$, and $CeO_2$.

14. The composition of claim 11 wherein RO is selected from the group consisting of MgO, CaO, SrO, and BaO.

15. The composition of claim 11 further comprising an oxide pigment, selected from the group consisting of iron brown hematite; cobalt silicate blue olivine; nickel barium titanium primrose priderite; lead antimonite yellow pyrochlore; nickel antimony titanium yellow rutile; nickel niobium titanium yellow rutile; nickel tungsten yellow rutile; chrome antimony titanium buff; chrome niobium titanium buff rutile; chrome tungsten titanium buff rutile; manganese antimony titanium buff rutile; titanium vanadium antimony grey rutile; manganese chrome antimony titanium brown rutile; manganese niobium titanium brown rutile; cobalt alu- minate blue spinel; zinc chrome cobalt aluminum spinel; cobalt chromate blue-green spinel; cobalt titanate green spinel; iron chromite brown spinel; iron titanium brown spinel; nickel ferrite brown spinel; zinc ferrite brown spinel; zinc iron chromite brown spinel; copper chromite black spinel; iron cobalt chromite black spinel; chrome iron manganese brown spinel; chrome iron nickel black spinel; chrome manganese zinc brown spinel; nickel manganese iron chromium black; tin vanadium yellow cassiterite; chrome tin orchid cassiterite; chrome tin pink sphene, and combinations thereof.

16. A composition for use in forming a porcelain enamel coating having a metallic appearance, said composition including a glass component comprising (a) a glass frit, said glass frit comprising by weight: about 45% to about 55% $SiO_2$, about 4 to about 20% $R_2O$, about 9 to about 15% $B_2O_3$, about 4 to about 12% $MnO_2$, about 1.5 to about 7% $F_2$, about 0% to about 20% $MO_2$, about 0% to about 10% RO, about 0% to about 6% $NO_2$, about 0% to about 2% $P_2O_5$, about 0% to about 3% CoO, about 0% to about 3% NiO, about 0% to about 3% $Al_2O_3$, about 0% to about 3% $Fe_2O_3$, about 0% to about 3% CuO, about 0% to about 4% $ZrO_2$, about 0% to about 2% $Nb_2O_5$, and about 0% to about 5% $Sb_2O_3$, wherein $R_2O$ represents at least one alkali oxide, wherein RO represents at least one alkaline earth oxide and wherein M represents at least one transition metal, and (b) a luster frit, wherein the luster frit comprises by weight: $SiO_2$ (46-54%), $B_2O_3$ (15-17%), $MnO_2$ (8-10%), $F_2$ (1.7-3.5%), $Na_2O$ (5-20%), $K_2O$ (2-9%), $NO_2$ (0-6%), $Li_2O$ (0-4%), $Al_2O_3$ (0-2%), BaO (0-5%), CaO (0-1%), CoO (0-1%), CuO (0-1%), $Fe_2O_3$ (0-2%), NiO (0-1%), $P_2O_5$ (0-3%), and $Sb_2O_3$ (0-3%).

17. A composition for use in forming a porcelain enamel coating having a metallic appearance, comprising:
   a. an amount (A) of a glass component comprising a metallic appearance frit;
   b. an amount (B) of a second frit selected from the group consisting of luster frits or clear/semi-opaque frits;
   c. wherein the weight ratio of A to B is about 1:1 to about 9:1, and
   d. wherein the metallic appearance frit comprises $SiO_2$ (45-55%), $R_2O$ (4-20%), $B_2O_3$ (9-15%), $MnO_2$ (4-12%), $F_2$ (1.5-7%), $MO_2$ (0-20%), RO (0-10%), $NO_2$ (0.01-6%), $P_2O_5$ (0-2%), CoO (0-3%), NiO (0-3%), $Al_2O_3$ (0.6-3%), $Fe_2O_3$ (0-3%), CuO (0-3%), $ZrO_2$ (0-4%), $Nb_2O_5$ (0-2%), and $Sb_2O_3$ (0-5%),
   e. wherein M represents a transition metal; wherein $R_2O$ represents one or more alkali oxides, and wherein RO represents one or more alkaline earth oxides.

18. The composition of claim 17 wherein $MO_2$ is present in an amount not exceeding about 20 wt %, and wherein $MO_2$ is selected from the group consisting of $ZrO_2$, $SnO_2$, $TiO_2$, $CeO_2$, and $La_2O_3$.

19. The composition of claim 17 wherein the second frit comprises a semi-opaque frit, wherein the semi-opaque frit comprises: $SiO_2$ (46-57%), $B_2O_3$ (11-17%), $F_2$ (1-10%), $Na_2O$ (5-20%), $TiO_2$ (0-13%), $NO_2$ (0-4%), $K_2O$ (0-12%), $Li_2O$ (0-4%), $Al_2O_3$ (0-3%), BaO (0-5%), CaO (0-3%), MgO (0-1%), $P_2O_5$ (0-2%), ZnO (0-3%), and $ZrO_2$ (0-3%).

20. A composition for use in forming a porcelain enamel coating having a metallic appearance, comprising:
   a. an amount (A) of a glass component comprising a metallic appearance frit;
   b. an amount (B) of a second frit selected from the group consisting of luster frits or clear/semi-opaque frits;

c. wherein the weight ratio of A to B is about 1:1 to about 9:1, and d. wherein the metallic appearance frit comprises $SiO_2$ (45-55%), $R_2O$ (4-20%), $B_2O_3$ (9-15%), $MnO_2$ (4-12%), $F_2$ (1.5-7%), $MO_2$ (0-20%), RO (0-10%), $NO_2$ (0-6%), $P_2O_5$ (0-2%), CoO (0-3%), NiO (0-3%), $Al_2O_3$ (0-3%), $Fe_2O_3$ (0-3%), CuO (0-3%), $ZrO_2$ (0-4%), $Nb_2O_5$ (0-2%), and $Sb_2O_3$ (0-5%), e. wherein M represents a transition metal;

f. wherein $R_2O$ represents one or more alkali oxides, g. wherein RO represents one or more alkaline earth oxides, and h. wherein the second frit comprises a luster frit, wherein the luster frit comprises: $SiO_2$ (46-54%), $B_2O_3$ (15-17%), $F_2$ (1.7-3.5%), $Na_2O$ (5-20%), $K_2O$ (2-9%), $MnO_2$ (8-10%), $NO_2$ (0-6%), $Li_2O$ (0-4%), $Al_2O_3$ (0-2%), BaO (0-5%), CaO (0-1%), CoO (0-1%), CuO (0-1%), $Fe_2O_3$ (0-2%), NiO (0-1%), $P_2O_5$ (0-3%), and $Sb_2O_3$ (0-3%).

* * * * *